R. B. SMITH & W. H. WHITNEY.
Pipe-Coupling.
No. 132,604. Patented Oct. 29, 1872.
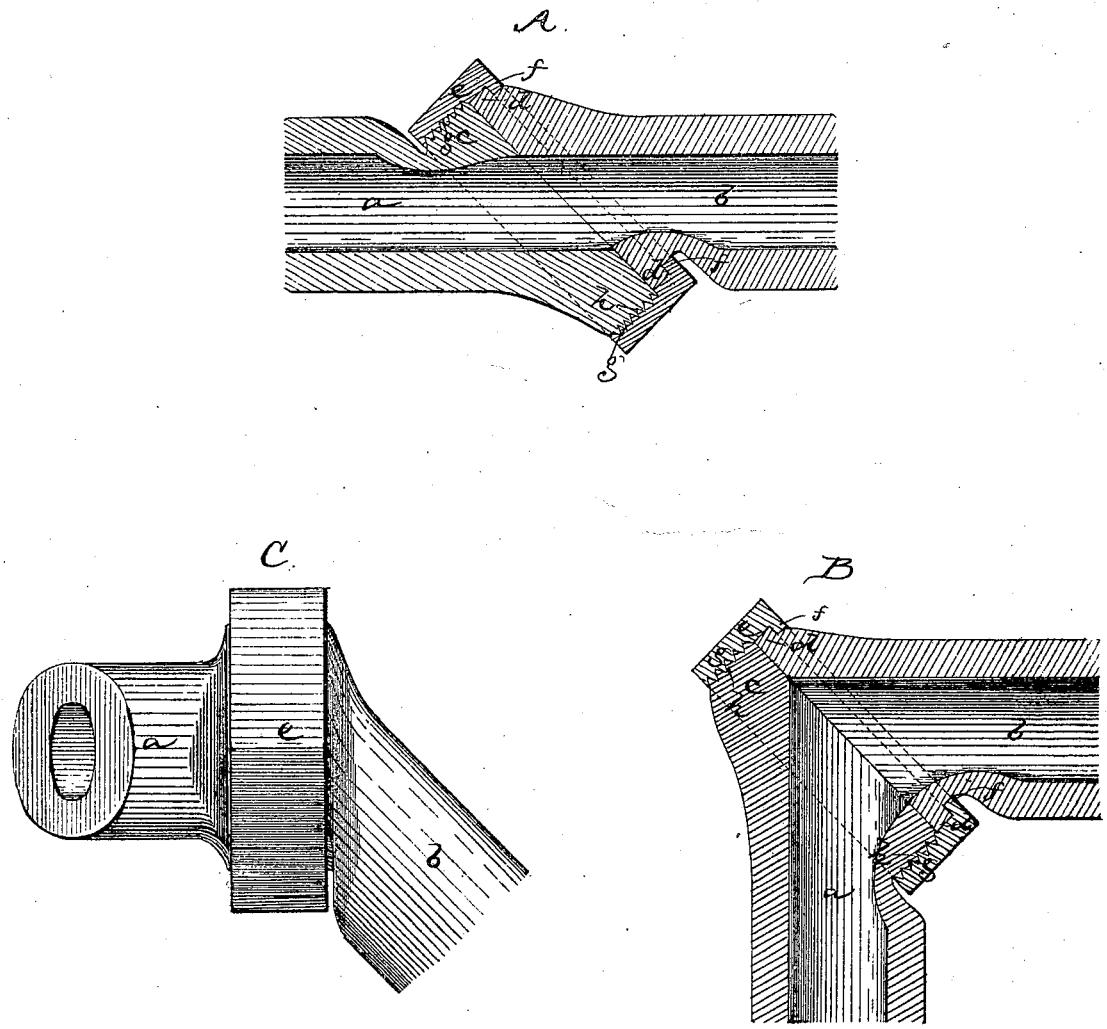
Witnesses.
M. W. Frothingham.
Se. H. Leatimer
Inventor.
Robert B. Smith.
Walter H. Whitney.
By their Attys.
Crosby & Gould

UNITED STATES PATENT OFFICE.

ROBERT B. SMITH, OF BOSTON, AND WALTER H. WHITNEY, OF CAMBRIDGE, MASSACHUSETTS.

IMPROVEMENT IN PIPE-COUPLINGS.

Specification forming part of Letters Patent No. 132,604, dated October 29, 1872.

*To all whom it may concern:*

Be it known that we, ROBERT B. SMITH, of Boston, in the county of Suffolk, and WALTER H. WHITNEY, of Cambridge, Middlesex county, all in the State of Massachusetts, have invented an Improvement in Coupling-Pipes; and we do hereby declare that the following, taken in connection with the drawing which accompanies and forms part of this specification, is a description of our invention sufficient to enable those skilled in the art to practice it:

The invention relates to an improved construction of metal pipes with reference to connection of lengths of pipe together, the invention having particular reference to making angling connections. In our invention we so construct the pipe ends and the coupling-nut that the pipes can be connected so as to stand in line, or so as to stand at any angle between a right angle and a straight line, one pipe end being made with a screw-head standing at an angle of forty-five degrees, and the other pipe end having a flange standing at a similar angle, and the two being connected by the screw-coupling, which has a lip or shoulder to take the flange and a nut-thread to screw upon the screw-head. It is in this construction that our invention consists.

The drawing represents two pieces of pipe made with and connected by our improved coupling construction.

A shows the parts in sectional view, connected so as to be in the same line. B shows them in section, connected at a right angle. C shows a connection at another angle.

*a* and *b* denote the two pieces of pipe to be connected. The pipe *a* is made with the screw-threaded end or head *c* formed at an angle of forty-five degrees to the straight part of the pipe, and the pipe *b* is made with the flange *d* at its end, this flange being also formed at an angle of forty-five degrees to the straight part of the pipe *b*. *e* denotes the coupling-nut. This nut is formed, like an ordinary coupling-nut, with a shoulder or lip, *f*, to take the flange *d*, and a nut-thread, *g*, to screw upon the screw-thread *h* of the pipe-head *c*.

To connect the pipes in line they are simply held in line, and the nut is turned with a suitable wrench until the joint is tight, suitable packing being used, or the abutting faces being ground, to make a tight joint. To connect the pipes at any desired angle, they are first brought to the required angle and then the nut is turned until the parts are tight. Thus without any additional labor the angling connection is made, and the construction of the pipes and method of connecting them are not only such as to enable the angling connection to be made, but also such as to enable a straight connection to be made without any change except as to positioning the pipes for connection. The coupling devices may be made as a short connector to couple straight and square ended or ordinary pipes, each outer end of the coupling being made with a nut-thread to screw upon the end of the straight pipe.

We claim—

The improved construction of pipes for connecting them in line or at any suitable angle, the same consisting in an inclined screw-head on one pipe and a similarly inclined flange on the other pipe, and a lipped screw-coupling to connect the two, substantially as described.

ROBERT B. SMITH.
WALTER H. WHITNEY.

Witnesses:
FRANCIS GOULD,
M. W. FROTHINGHAM.